US005848095A

United States Patent [19]

Deutsch

[11] Patent Number: 5,848,095

[45] Date of Patent: Dec. 8, 1998

[54] SYSTEM AND METHOD FOR ADAPTIVE HOPPING

[75] Inventor: Brian Mark Deutsch, Maple Valley, Wash.

[73] Assignee: WAVTrace, Inc., Bellevue, Wash.

[21] Appl. No.: 648,404

[22] Filed: May 17, 1996

[51] Int. Cl.[6] .......... H04B 1/713

[52] U.S. Cl. .......... 375/202; 370/441

[58] Field of Search .......... 375/202; 370/320, 370/335, 342, 441

[56] References Cited

U.S. PATENT DOCUMENTS

| | | | |
|---|---|---|---|
| 5,278,992 | 1/1994 | Su et al. | 455/69 |
| 5,323,447 | 6/1994 | Gillis et al. | 379/61 |
| 5,418,839 | 5/1995 | Knuth et al. | 379/61 |
| 5,528,623 | 6/1996 | Foster, Jr. | 375/202 |
| 5,590,410 | 12/1996 | Deutsch et al. | 455/76 |
| 5,712,848 | 1/1998 | Deutsch | 370/280 |

OTHER PUBLICATIONS

"Spread spectrum goes commercial," Schilling et al., *IEEE Spectrum*, Aug. 1990, pp. 40–41 and 44–45.

*Primary Examiner*—Don N. Vo
*Attorney, Agent, or Firm*—Fulbright & Jaworski L.L.P.

[57] ABSTRACT

An adaptive hopping system and method using preestablished frequency assignments in a plurality of time slot groups is used to allow all units to be manufactured with the same preset frequency assignments. The preset frequencies are such that there is a minimum distance, for example 2 MHz, between any adjacent time slot in the same time slot group and between corresponding time slots of a next adjacent time slot group. When a time slot in a time slot group is marked (for example for poor communication) the same time slot in the next adjacent time slot group is used in place of the marked time slot group.

18 Claims, 5 Drawing Sheets

FIG. 3

| | TIME SLOT 1 | TIME SLOT 2 | TIME SLOT 3 | ... | TIME SLOT 49 | TIME SLOT 50 |
|---|---|---|---|---|---|---|
| GROUP A | A1 | A2 | A3 | ... | A49 | A50 |
| GROUP B | B1 | B2 | B3 | ... | B49 | B50 |
| GROUP C | C1 | C2 | C3 | ... | C49 | C50 |
| GROUP D | D1 | D2 | D3 | ... | D49 | D50 |

FIG. 4

| CHANNEL | FREQUENCY (MHz) |
|---|---|
| 1 | 902.00 |
| 2 | 902.13 |
| 3 | 902.26 |
| ⋮ | ⋮ |
| 199 | 927.87 |
| 200 | 928.00 |

1, 4, 10, 7, 3, 6, 9, 5, 2, 8, 3, 6, 9, 5, 2, 8, 1, 4, 10, 7, 2, 8, 1, 4, 10, 7, 3, 6, 9, 5, 10, 7, 3, 6, 9, 5, 2, 8, 1, 4, 9, 5, 2, 8, 1, 4, 10, 7, 3, 6

RECURSE RECURSE RECURSE RECURSE

FIG. 6

4, 10, 7, 3, 6, 9, 5, 2, 8, 1, 6, 9, 5, 2, 8, 1, 4, 10, 7, 3, 8, etc.

RECURSE RECURSE

| SLOT | GROUP A | CHANNEL | GROUP B | CHANNEL | GROUP C | CHANNEL | GROUP D | CHANNEL |
|---|---|---|---|---|---|---|---|---|
| 1 | A1 | 14 | B1 | 74 | C1 | 198 | D1 | 137 |
| 2 | A2 | 71 | B2 | 199 | C2 | 129 | D2 | 42 |
| 3 | A3 | 186 | B3 | 122 | C3 | 55 | D3 | 110 |
| 4 | A4 | 126 | B4 | 43 | C4 | 102 | D4 | 168 |
| 5 | A5 | 59 | B5 | 114 | C5 | 177 | D5 | 87 |
| 6 | A6 | 118 | B6 | 179 | C6 | 94 | D6 | 26 |
| 7 | A7 | 166 | B7 | 97 | C7 | 24 | D7 | 148 |
| 8 | A8 | 85 | B8 | 31 | C8 | 152 | D8 | 9 |
| 9 | A9 | 40 | B9 | 157 | C9 | 5 | D9 | 77 |
| 10 | A10 | 145 | B10 | 7 | C10 | 61 | D10 | 187 |
| 11 | A11 | 44 | B11 | 109 | C11 | 167 | D11 | 93 |
| 12 | A12 | 112 | B12 | 180 | C12 | 83 | D12 | 38 |
| 13 | A13 | 163 | B13 | 98 | C13 | 28 | D13 | 141 |
| 14 | A14 | 95 | B14 | 36 | C14 | 158 | D14 | 19 |
| 15 | A15 | 34 | B15 | 149 | C15 | 17 | D15 | 68 |
| 16 | A16 | 160 | B16 | 3 | C16 | 70 | D16 | 182 |
| 17 | A17 | 11 | B17 | 78 | C17 | 181 | D17 | 124 |
| 18 | A18 | 65 | B18 | 185 | C18 | 130 | D18 | 54 |
| 19 | A19 | 196 | B19 | 136 | C19 | 41 | D19 | 103 |
| 20 | A20 | 125 | B20 | 60 | C20 | 119 | D20 | 170 |
| 21 | A21 | 33 | B21 | 156 | C21 | 2 | D21 | 62 |
| 22 | A22 | 144 | B22 | 16 | C22 | 72 | D22 | 194 |
| 23 | A23 | 10 | B23 | 64 | C23 | 189 | D23 | 131 |
| 24 | A24 | 67 | B24 | 195 | C24 | 139 | D24 | 45 |
| 25 | A25 | 192 | B25 | 138 | C25 | 52 | D25 | 115 |
| 26 | A26 | 135 | B26 | 56 | C26 | 106 | D26 | 175 |
| 27 | A27 | 57 | B27 | 107 | C27 | 169 | D27 | 82 |
| 28 | A28 | 104 | B28 | 178 | C28 | 91 | D28 | 30 |
| 29 | A29 | 174 | B29 | 88 | C29 | 35 | D29 | 159 |
| 30 | A30 | 89 | B30 | 37 | C30 | 150 | D30 | 13 |
| 31 | A31 | 191 | B31 | 140 | C31 | 46 | D31 | 116 |
| 32 | A32 | 123 | B32 | 47 | C32 | 117 | D32 | 171 |
| 33 | A33 | 58 | B33 | 101 | C33 | 161 | D33 | 92 |
| 34 | A34 | 105 | B34 | 164 | C34 | 90 | D34 | 21 |
| 35 | A35 | 165 | B35 | 86 | C35 | 39 | D35 | 143 |
| 36 | A36 | 81 | B36 | 29 | C36 | 147 | D36 | 6 |
| 37 | A37 | 23 | B37 | 155 | C37 | 8 | D37 | 73 |
| 38 | A38 | 153 | B38 | 12 | C38 | 69 | D38 | 190 |
| 39 | A39 | 15 | B39 | 63 | C39 | 183 | D39 | 133 |
| 40 | A40 | 75 | B40 | 188 | C40 | 121 | D40 | 51 |
| 41 | A41 | 162 | B41 | 100 | C41 | 27 | D41 | 151 |
| 42 | A42 | 99 | B42 | 22 | C42 | 142 | D42 | 20 |
| 43 | A43 | 25 | B43 | 154 | C43 | 1 | D43 | 76 |
| 44 | A44 | 146 | B44 | 4 | C44 | 80 | D44 | 197 |
| 45 | A45 | 18 | B45 | 66 | C45 | 200 | D45 | 134 |
| 46 | A46 | 79 | B46 | 184 | C46 | 128 | D46 | 53 |
| 47 | A47 | 193 | B47 | 127 | C47 | 49 | D47 | 108 |
| 48 | A48 | 132 | B48 | 48 | C48 | 120 | D48 | 172 |
| 49 | A49 | 50 | B49 | 113 | C49 | 173 | D49 | 96 |
| 50 | A50 | 111 | B50 | 176 | C50 | 84 | D50 | 32 |

SYSTEM AND METHOD FOR ADAPTIVE HOPPING

RELATED APPLICATIONS

This application is related to Ser. No. 08/329,467, CORDLESS TELEPHONE SYSTEM HAVING AUTOMATIC CONTROL, filed Oct. 26, 1994 which is now U.S. Pat. No. 5,528,623; Ser. No. 08/329,435, SYSTEM AND METHOD FOR FREQUENCY BASED ACQUISITION ACKNOWLEDGEMENT BETWEEN TRANSMITTER AND RECEIVER, filed Oct. 26, 1994 which is now U.S. Pat. No. 5,590,410; and Ser. No. 08/570538, TIME DIVISION MULTIPLEX COMMUNICATIONS SYSTEM INCLUDING MEANS FOR REDUCING UNDESIRED ECHOES RESULTING FROM CIRCUIT DELAYS, filed Dec. 12, 1995, which is now U.S. Pat. No. 5,712,848, which are hereby incorporated by reference herein. These applications are commonly assigned.

TECHNICAL FIELD OF THE INVENTION

The invention relates to a method and system for providing a frequency hopping communications system and more particularly to such a system which adaptively reallocated channel usage based on a fixed time slot assigned.

BACKGROUND OF THE INVENTION

There presently exists a requirement that any frequency hopping system has at least 50 channels in any hopping cycle. In the past, other systems have dealt with the algorithm or the decision-making process of choosing an alternate channel for replacing a bad channel by various systems. One system, as referenced in Gillis, et al., U.S. Pat. No. 5,323,447, dated Jun. 21, 1994 has a first set of 50 channels and a second set of pseudo-randomly chosen channels. In Gillis, et al., if a bad channel is detected in the first set of 50 channels, a substitute channel, chosen from the second set, is offered up by the base unit. The second set of channels, as per Gillis, et al., is approximately ten channels that are set aside as backup channels. Thus, any one of these ten "spare" channels can be substituted by the base unit only. The base would issue a command to a handset telling the handset to change to a selected one of the new secondary channels in response to a detection of a bad channel by either the base or the handset.

The manner in which a bad channel is detected in the base or in the handset is well known in the art. One way this is done is the detection of a Barker sequence or, a Willard sequence, which is a known sequence such that it is distinct from random noise. The detection of this "special" sequence in every frame or the lack of any detection of this sequence would be cause to mark a channel as bad.

Another method of detecting a faulty channel would be as part of the security code that is passed between the units or through a control channel, or encoded into each frame.

Other methods for detecting faulty channels would be to employ Receive Signal Strength Indicators to indicate the power of the signal. Other possibilities that could be used would be to use a clock recovery circuit to determine clock skew. If clock skew is out of a useable range, then that could be an indication of jamming or a possible fading which would indicate a bad channel.

A problem associated with the prior art is that the choice of a secondary group of ten frequencies pseudo-randomly chosen results in a situation where there is no system-wide coordination. In other words, if there is more than one system of this type on the air at any given time in a given physical space, there would be no coordination between them from time slot to time slot. Thus, when a substitution occurs, the substitute channel could very likely be in use by another system during the same time slot.

SUMMARY OF THE INVENTION

These and other objects are achieved in a system and method where frequencies are selected for substitution in a frequency hopping system by reference to time slots. Time slots are used to indicate each channel's position in a 50-channel cycle. Each time slot has four groups of channels associated with it. In our embodiment, each group would have 50 channels.

The efficacy of this system and method in terms of the problems that it solves is as follows:

In the situation where two channels are set aside for initial synchronization, the inventive system uses 50 channels from a "home" group. These 50 "home" channels are the channels used for synchronization in keeping with government regulations regarding broadcasting in a frequency hopping system.

All units have the same channel assignment for each time slot. Once the signal has been acquired by either the handset receiving a signal initiated by the base or by a base unit receiving a signal initiated by the handset, the system switches to the second group frequency set. It is assumed that all frequencies in the second group are good. For convenience, the first group is referred to as A, the second B, the third C, and the fourth D. Accordingly, each group has 50 time slots numbered 1–50 (i.e. A1, A2, A3, etc.). The system then hops from B1 through the sequence B2, B3, B4, etc. It should not be assumed that these frequencies are sequential in terms of where they lie in the frequency band. Channel B1 could be, for instance, at 910 MHz and channel B2 could be, for instance, at 903 MHz.

The reason that it is important that Groups B, C and D are allotted for the actual talking mode and Group A allocated for the home channel mode will be illustrated as follows: One unit comes online, acquires a lock and switches to the Group B channels. By way of example, let us assume that in Group B time slot 2, which is called channel B2, is found to interfere. In this situation channel C2 would substitute for channel B2. Channel C2 is a known channel. If channel C2 is shown to be bad, the next time through the cycle channel D2 is substituted for channel C2. Since the home channel (Group A) acquisition scheme is much more fragile than the tracking scheme, it is therefore important that these channels be used only when all else fails. It is the employment of four groups of 50 channels each that are carefully selected and the same from every unit to every other unit that allows the system to systematically keep these home channels clear.

Another problem that is solved by this system and method is that by predetermining the hop distance, i.e., predetermining what channel is assigned to A1 and what channel is assigned to A2 and what channel is assigned to B1 and to B2, etc., the channels are always spaced a proper distance apart and thus any interference possibility is reduced.

There is an algorithm that we may employ in a claim that actually breaks the spectrum into distinct subbands and jumps from subband to subband, but we can discuss that later.

So, it is another benefit of this invention that we guarantee frequency diversity from hop to hop.

A third problem that arises is when multiple users are present in a shared space. It is beneficial that these users be able to, for lack of a better word, chase each other from time slot to time slot. To illustrate, I give the following example. If user A comes on at time T0 and user B comes on at time T0 plus one frame, user A would be on time slot 2 when user B is still on time slot 1. By keeping them in these specific and distinct time slots, they can essentially chase each other around the cycle without ever hitting one another. If they have to substitute channels, they substitute them within their own time slot, never out of their time slot, so that there is never contention from time slot to time slot. This way we can pack the maximum amount of users in the band, unlike the Gillis method of randomly or pseudo-randomly choosing alternates which cross time slot to time slot. In other words, in time slot 2, user A could possibly have the same frequency, say channel 10, as user B has in that same time slot 40, which would be problematic.

Because oscillators in each unit are not time locked to one another, it is possible for the units to creep up on one another so they will not synchronously follow each other in time. This problem, which is referred to as channel, or time creep, is handled separately.

In the preferred embodiment of the invention, it is a particular characteristic that if either the base or the handset senses a bad channel (through either interference or lack of signal quality), either can initiate a change to a different channel for a given slot. Both the base and the handset carry a hop table in their respective memories since every unit has the same hop channel sequence. Thus, the unit that detects the interference can easily determine that it has been interfered with, and it efficiently requests that the other unit, be it the base or the handset, change the assignment of a bad time slot from one group to another group. This allows for a much easier signaling scheme.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 shows a chart of four groups of channels;

FIG. 4 shows the frequency assignment for each channel;

FIG. 5 shows one random assignment of frequency assignments for each slot of each group; and FIGS. 6 and 7 show sequences for obtaining the proper channel spacing.

DESCRIPTION OF THE PREFERRED EMBODIMENTS

Figure 1:
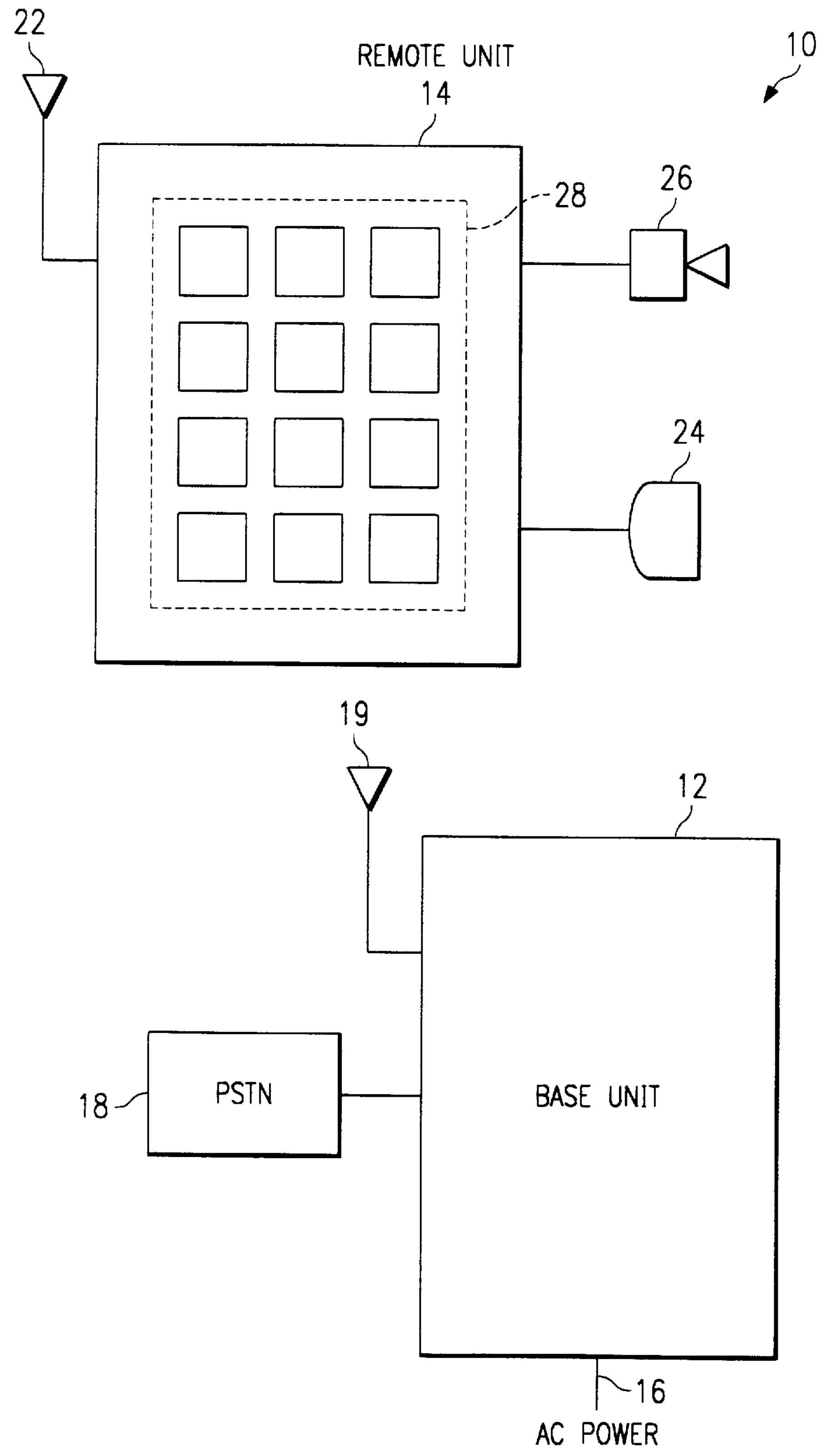
FIG. 1 is a block diagram of a communications system in accordance with a preferred embodiment of the present invention having first and second communications units.

Referring now to FIG. 1, a communications system embodying the present invention will be described.

Communication system 10 includes a base unit 12 and a remote unit 14.

Base unit 12 receives its power from the alternating current power supply by the power utility on lines 16 and is connected to a public switching telephone network (PSTN) 18. Also, base unit 12 includes an antenna 19 for communications with remote unit 14. Remote unit 14 communicates with base unit 12 by transmission and reception of radio frequency signals through antenna 22. Remote unit 14 also may include a microphone 24 and a speaker or earpiece 26 for conversion of signals between sound and electronic form. In addition, remote unit 14 may also include a keypad of the DTMF type.

Figures 2, 2A:
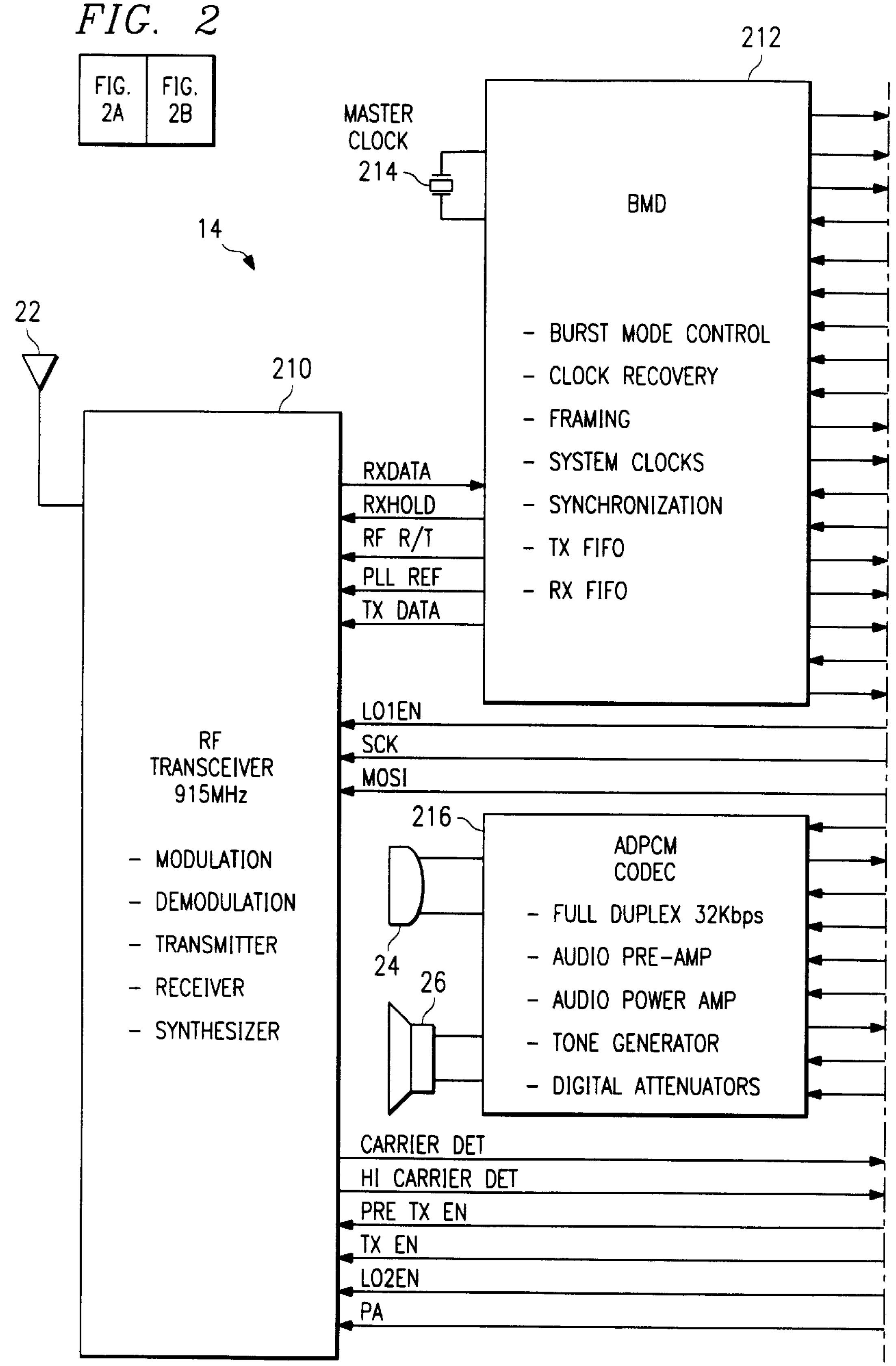
FIG. 2 is a block diagram of one of the communications units in FIG. 1 in accordance with a preferred embodiment of the present invention.
Figure 2B:
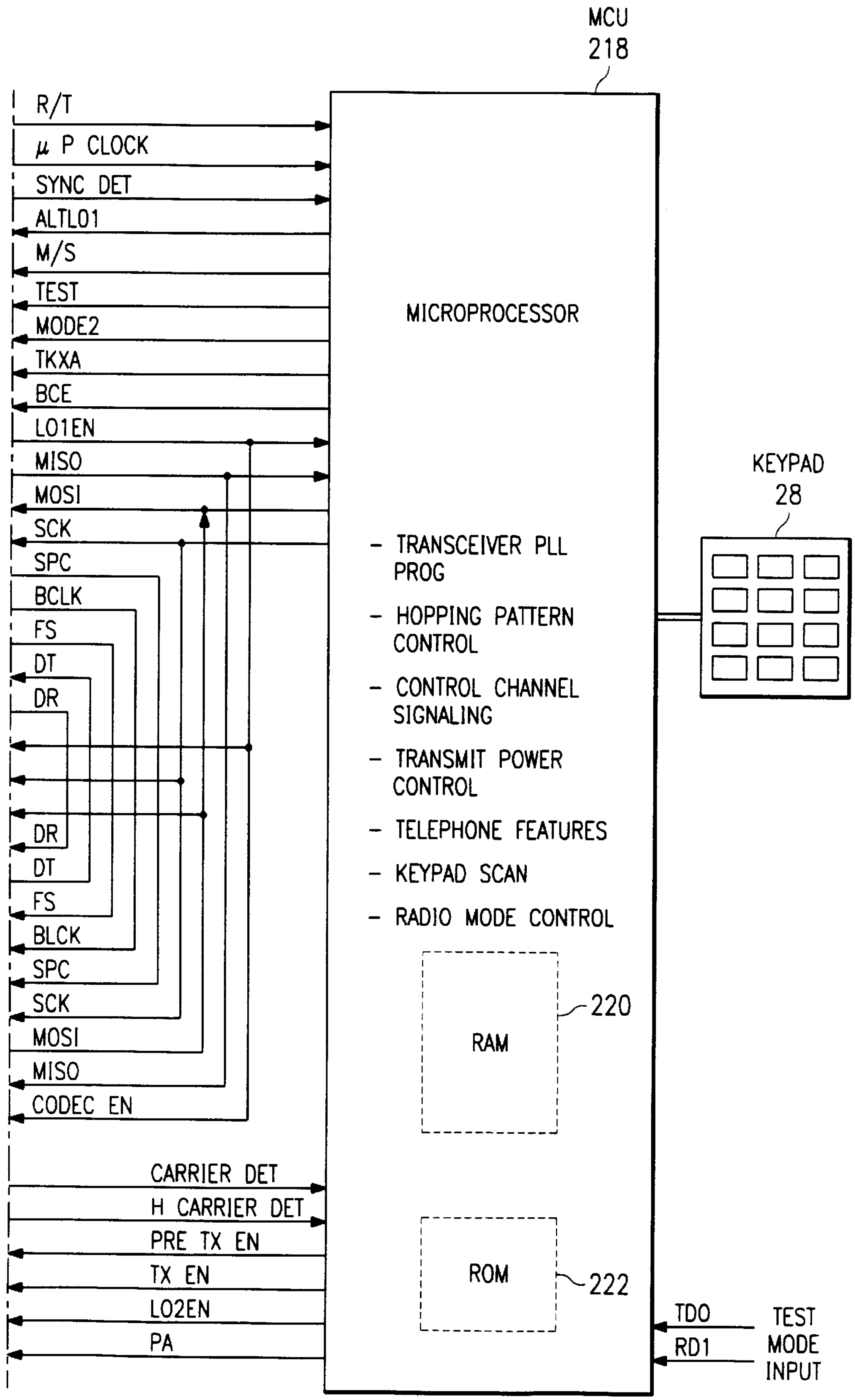

Referring now to FIG. 2, one unit of communication system 10, for example remote unit 14, will be described in greater detail.

It should be noted that the communications functions, including transmit power and frequency control described with reference to remote unit 14 will be the same for base unit 12. Base unit 12 may or may not include a keyboard 28 and most likely will not include a microphone 24 and an ear piece or speaker 26 as does the remote unit 14.

Remote unit 14 communicates with base station 12 through RF transceiver 210 which receives signals from and transmits signals to base unit 12 through antenna 22. The RF transceiver provides a frequency synthesizer, an RF receiver, an RF transmitter and modulation and demodulation functions in remote unit 14. Burst mode device 212 communicates with transceiver 210 to control burst mode operation to recover clock signals and to synchronize data frames between the base unit 12 and the remote unit 14. Burst mode unit 212 also controls sequencing and outputting of data from the VOICE CODEC. VOICE CODEC contains a Pulse Code Modulation (PCM) codec-filter. The name codec is an acronym from "COder" for the analog-to-digital converter (ADC) used to digitize voice and the "DECoder" for the digital-to-analog converter (DAC) used for reconstructing voice. A codec is a single device used for digitizing and reconstructing the human voice. Typically, the voice is quantized with an 8-bit word at a sampling rate of 8 KHz yielding a serial data rate of 64 kbps.

64 kbps PCM codecs are widely known in the art and are readily available from manufacturers such as Motorola, OKI of Japan and Texas Instruments.

The burst mode device 212 has as a fundamental frequency control a master clock 214 which provides timing signals to permit the burst mode device 212 to generate clocking signals to other functional units in remote unit 14. The BMD provides bit timing and frame timing recovery. A digital phase lock loop (DPLL) within the BMD extracts the bit timing from the signal by measuring the time interval between zero crossings of the receive signal. With bit timing established, a correlator is used to detect the presence of a 24-bit unique word sequence embedded in the transmission stream. Detection of the 24-bit unique word identifies framing boundaries. Also embedded in the transmission stream is a 24-bit unique ID which prevents synchronization with an undesired system. The BMD uses the recovered frame timing to correctly position the transmit and receive bursts within the frame.

The operation of burst mode devices in TDD applications is widely known in the art. They are used in second generation cordless telephone systems (CT2) and the Digital European Cordless Telecommunications (DECT) system. Burst mode devices for these systems are manufactured by Motorola, Philips and VLSI Technology.

VOICE CODEC 216 converts sound information received by microphone 24 to electrical signals, amplifies the electrical audio frequency signals and converts the audio frequency signals to digital representation by means of an analog to digital converter (ADC). VOICE CODEC 216 also includes a digital to analog converter (DAC) for converting received information in digital form to analog form. An audio power amplifier amplifies the converted analog information and provides it to speaker 26 for conversion to sound for the user. A pulse code modulation technique is used in the ADC and in the DAC. The pulse trains are provided to the burst mode device 214 for storage in a transmit temporary storage device such as a FIFO buffer for transmission to transceiver 210 at an appropriate time to be transmitted in one or more transmission frames. Conversely, burst mode device 212 receives incoming data from RF transceiver 210 and stores the incoming data in pulse code format in a receive buffer which may be a FIFO buffer for transmission to the VOICE CODEC 216 for conversion to an analog signal for amplification and conversion to sound in speaker 26.

The functions described above for remote unit 14 and similarly for base unit 12 are controlled by mode control unit 218.

Mode control unit 218 includes a microprocessor such as a model 6805C8 commercially available microprocessor, a random access memory 220, and a read only memory 222. Mode control unit 218 is connected to keypad 28 for entry of DTMF signals and to burst mode device 212, VOICE CODEC 216 and to RF transceiver 210. MCU 218 controls all the functions in unit 14. For example, mode control unit 218 controls the phase lock loop (PLL) programming for transceiver 210, the frequency hopping pattern control, control channel signaling for synchronization, transmit power control for RF transceiver 210, mode control for RF transceiver 210 and other telephone features which are not significant to the present invention. Data related to mode control are stored in random access memory 220, which is a part of mode control unit 218, and bootstrap code and basic control code for microprocessor 6805C8 is stored in read only memory 222.

Frequency control coefficients for RF transceiver 210 are stored in random access memory 220 in mode control unit 218. A table in random access memory 220 stores the pattern of frequency hopping which will control transceiver 210.

MCU 218 also interprets data in the form of received signal strength indicator (RSSI). The RSSI signal and signals indicating channel quality are used to determine if low power signal frequency transmission is sufficient to maintain quality communication or if higher power frequency hopping transmission is required to maintain communication over the communication channel.

OPERATION OF FREQUENCY LOCKING TECHNIQUE IN ACCORDANCE WITH THE PREFERRED EMBODIMENT OF THE PRESENT INVENTION

The communications system according to the present invention takes advantage of frequency hopping techniques and employs a group of 50 home channels. In this system which may be embodied by a wireless telephone system having a base unit and remote unit, both base and remote are in standby mode when not in communication. While in standby mode, both units scan a preselected group, such as Group A, of the channels attempting to get in a lock, or hopping mode. Once the system achieves lock, it switches from the A set of channels to the B set of channels as shown in FIG. 3.

Assuming that all of the channels in group B are functioning properly, then the base and the handset will hop from B1 to B2 to B3 to B4 to B5 etc. to B50 and then recycle starting at B1, B2, etc.

In the situation where a time slot, for example time slot 3, of the B group is bad, not functioning properly or having interference on the channel, the system will at the time slot 3 switch to use the frequency of C3. In such a situation, the sequence would be B1, B2, C3, B4, B5. Again, assuming that a channel such as B49 is determined to be bad, then the system would switch to C49 such that the sequence would be B1, B2, C3, B4, B5, etc., B48, C49, B50.

Assuming now that channel C3 as well as channel B3 is determined to be inoperative, then the sequence would be B1, B2, D3, B4, B5, etc., B48, C49, B50. As will be discussed, the channels next to each other, i.e. B1, B2, are not sequential channels in frequency and have been assigned to a specific frequency according to a table that is established in the memory of the unit at the time of manufacture. Note that channels (frequencies) can be determined to be inoperative by several well known means as discussed above. Also, provision can be made for the user to make a frequency (time slot) unavailable for certain periods of time.

FIG. 4 shows the channels 1–200 and the difference in frequency of 0.13 MHz per channel time slot.

FIG. 5 is a typical example of the frequencies by channel time slot that are in group A, group B, group C, and group D. Note that in every direction there is a spacing of at least 2 MHz so that there is a minimum of possible interference between channels. This takes into account the situation that when a channel is bad it is most likely a situation where frequencies around that channel will also be bad and therefore attempting to use a channel too close to the previously used channel would result in a further requirement for selecting another channel. This is avoided in the system and method of this invention.

ADAPTIVE FREQUENCY PLAN

Conditions:

Frequency Range—902–928 MHz

Bandwidth—26 MHz

Bandwidth/channel—13 MHz

Number of channels—200

Number of channel groups—4 (A, B, C, D)

Number of channels/group—50

Objectives:

Each consecutive frequency within a frequency group (set) should be spaced at least 13 MHz from the previous or following channel frequency in that group.

From group to group within any time slot (TS1–TS50), the channels should be spaced at least 2 MHz from each other.

Procedure:

1) Divide the channels (1–200) into 10 subbands $SB_1$=1–20 $SB_2$=21–40 . . . $SB_{10}$=181–200

2) Create random sequence of subbands e.g. 1, 4, 10, 7, 3, 6, 9, 5, 2, 8.

3) Recursively position the random sequence through 50 channels to form a group as shown in FIG. 6.

4) Advance one place in random sequence and form next group as shown in FIG. 7.

5) Repeat step 4 for remaining groups.

6) 50 subband sequences should be created and, for each subband within each group, randomly select a distinct (not previously assigned) channel within that subband and assign that channel to a position in the group sequence until all 200 channels are distributed throughout the four channel groups.

The system could, of course, work with any number of groups and with any number of channels.

Although the present invention and its advantages have been described in detail, it should be understood that various changes, substitutions and alterations can be made herein without departing from the spirit and scope of the invention as defined by the appended claims.

What is claimed is:

1. A method of communicating between a base unit and a handset unit in a cordless telephone employed in a frequency hopping system, both the base unit and the handset unit capable of communicating with each other over any one of a plurality of frequencies, where the frequencies in the respective units hop from one frequency to the next in a rotation controlled by sequential time slots, comprising the steps of:

using a first set of frequencies arranged in a preestablished pattern of frequencies by said respective units for the purpose of establishing that one or the other of said base unit or said handset unit desires to communicate with the other unit in a frequency hopping mode, said first set of frequencies being a preestablished number cycled through a plurality of time slots and having a frequency spacing along the frequency spectrum at least a minimum distance between adjacent time slots;

upon determining a desire to communicate in a hopping mode by using said first set of frequencies, said respective units both switch to a predetermined second set of frequencies arranged in a preestablished number and pattern of frequencies, one such frequency for each said time slot, said second set of frequencies having a frequency spacing at least a minimum distance between adjacent time slots and each said frequency in each said time slot having a frequency spacing at least a minimum distance as between a frequency in a particular time slot in said second set of frequencies and a frequency in that same particular time slot in said first set of frequencies; and upon detecting in either the base unit or the handset unit during any one time slot that the quality of communication has fallen below a certain threshold level, shifting the use of that one time slot in both said units to the same time slot in a third set of frequencies, said frequencies in said third set of frequencies arranged in a preestablished number and pattern of frequencies, one such frequency for each said time slot, said third set of frequencies having a frequency spacing at least a minimum distance between adjacent time slots and each said frequency in each said time slot having a frequency spacing at least a minimum distance as between a frequency in a particular time slot in said third set of frequencies and a frequency in that same particular time slot in said second set of frequencies.

2. The method of communicating as set forth in claim 1, further including the step of:

upon detecting in either the base unit or the handset unit during any one time slot of said third set of frequencies that the quality of communication has fallen below a certain threshold level, shifting the use of that one time slot in said third set of frequencies to the same time slot in a fourth set of frequencies, said frequencies in said fourth set of frequencies arranged in a preestablished number and pattern of frequencies, one such frequency for each said time slot, said fourth set of frequencies having a frequency spacing at least a minimum distance between adjacent time slots and each said frequency in said time slot having a frequency spacing at least a minimum distance as between a frequency in a particular time slot in said fourth set of frequencies and a frequency in that same particular time slot in said third set of frequencies.

3. The method of communicating as set forth in claim 2, further including the step of:

marking certain time slots in any of said first, second, third and fourth sets of frequencies as being unavailable; and when said marked certain time slots are sequenced, inhibiting the use of the frequency of said marked time slots in a marked set of frequencies, and substituting instead the frequencies in the corresponding time slots of a selected other one of said frequency sets.

4. The method of communicating as set forth in claim 1, wherein said minimum distance between frequency sets and between frequencies in adjacent time slots of a frequency set is at least 2 MHz.

5. The method of communicating as set forth in claim 1, wherein each frequency is at least 0.13 MHz different from any other frequency.

6. The method of communicating as set forth in claim 2, wherein said frequency sets are established by:

a) dividing the available bandwidth w by the minimum frequency separation s to arrive at w/s channels;

b) divide the channels w/s into a number of subbands;

c) create a random sequence of said subbands;

d) recursing position the random sequence through w/s channels; and e) repeat step d) for each remaining group.

7. A system for communicating between communication units wherein the communication units are capable of communicating with each other over any one of a plurality of frequency channels and wherein said frequency channels are arranged in a preestablished pattern of frequencies in a first group of time slots, each time slot assigned a different frequency, said first group of time slots having a frequency spacing along the frequency spectrum at least a minimum distance between adjacent time slots, said system comprising:

means for determining a desire to communicate in a hopping mode by cycling both said units through said first time slot group and for causing both said units to switch to a predetermined second time slot group having one frequency for each said time slot, and having a frequency spacing along the frequency spectrum at least a minimum distance between adjacent time slots and each said frequency in each said second time slot group having a frequency spacing along the frequency spectrum at least a minimum distance as between a frequency in a particular time slot in said second time slot group and said frequency in that same particular time slot in said first time slot group;

means for marking one or more time slots; and means for shifting the use of any marked time slot to the same time slot of a third time slot group having one frequency for each said time slot, and having a frequency spacing along the frequency spectrum at least a minimum distance between adjacent time slots and each said frequency in each said third time slot group having a frequency spacing along the frequency spectrum at least a minimum distance as between a frequency in a particular time slot in said third time slot group and said frequency in that same particular time slot in said second time slot group.

8. The system as set forth in claim 7 further including:

means for shifting the use of a marked time slot in said third time slot group to the same time slot in a fourth time slot group having one frequency for each said time slot, and having a frequency spacing along the frequency spectrum at least a minimum distance between adjacent time slots and each said frequency in said fourth time slot group having a frequency spacing along the frequency spectrum at least a minimum distance as between a frequency in a particular time slot in said fourth time slot group and said frequency in that same particular time slot in said third time slot group.

9. The system as set forth in claim 7 wherein said marking means includes:

means for marking a time slot when the quality of communication has fallen below a certain threshold level.

10. The system set forth in claim 7 wherein said marking means includes:

means for selectively marking one or more time slots under control of a user.

11. The system set forth in claim 7 wherein said marking means includes:

means for marking one or more time slots under control of system operation.

12. The system set forth in claim 7 wherein said marking means includes:

means for marking at least a portion of a time slot group.

13. The method of manufacturing a base unit for use in communications systems, wherein said base unit and a handset unit may communicate with each other over any one of a plurality of frequencies where the frequencies in said base unit and said handset unit hop from one frequency to the next in a rotation controlled by sequential time slots, said method comprising the steps of:

establishing in the base unit at least three sets of time slots, each set having a preestablished number and pattern of frequencies, one such frequency for each time slot, said frequencies having a frequency spacing at least a minimum distance between adjacent time slots and each said frequency in each time slot having a frequency spacing at least a minimum distance as between a frequency in a particular time slot set and a frequency in that same particular time slot in a next adjacent time slot; and programming said base unit such that it operates in a preset manner such that any selected ones of said time slots in any time slot set can be marked for special treatment and further programmed such that during a time slot cycling sequence when said marked time slot in a particular time slot group is activated, shifting such activation to the corresponding time slot of a selected other one of said time slot groups.

14. The method of communicating as set forth in claim 13 wherein said minimum distance between frequency sets and between frequencies in adjacent time slots of a frequency set is at least 2 MHz.

15. The method of communicating as set forth in claim 13 wherein each frequency is at least 0.13 MHz different from any other frequency.

16. The method of manufacturing a handset unit for use in communications systems, wherein said handset unit and a base unit may communicate with each other over any one of a plurality of frequencies where the frequencies in said handset unit and said base unit hop from one frequency to the next in a rotation controlled by sequential time slots, said method comprising the steps of:

establishing in the handset unit at least three sets of time slots, each set having a preestablished number and pattern of frequencies, one such frequency for each time slot, said frequencies having a frequency spacing at least a minimum distance between adjacent time slots and each said frequency in each time slot having a frequency spacing at least a minimum distance as between a frequency in a particular time slot set and a frequency in that same particular time slot in a next adjacent time slot; and programming said handset unit such that it operates in a preset manner such that any selected ones of said time slots in any time slot set can be marked for special treatment and further programmed such that during a time slot cycling sequence when said marked time slot in a particular time slot group is activated, shifting such activation to the corresponding time slot of a selected other one of said time slot groups.

17. The method of communicating as set forth in claim 16 wherein said minimum distance between frequency sets and between frequencies in adjacent time slots of a frequency set is at least 2 MHz.

18. The method of communicating as set forth in claim 16 wherein each frequency is at least 0.13 MHz different from any other frequency.

* * * * *